United States Patent Office 3,128,307
Patented Apr. 7, 1964

3,128,307
PROCESS FOR THE MANUFACTURE OF COPOLYMERS FROM OLEFINS AND DERIVATIVES OF VINYLSULFONIC ACID AND PRODUCTS OBTAINED THEREBY
Hermann Zorn and Michael Franz, Vienna, Austria, assignors, by mesne assignments, to Hercules Powder Company Incorporated, Wilmington, Del., a corporation of Delaware
No Drawing. Filed Apr. 27, 1959, Ser. No. 808,874
Claims priority, application Germany Apr. 30, 1958
6 Claims. (Cl. 260—543)

The present invention provides a process for making copolymers from olefins and derivatives of vinylsulfonic acid.

It is known that chemically pure ethylene can be polymerized at atmospheric pressure using a catalyst system comprising (a) an organo-metal compound of an element belonging to main groups 1–3 or subgroup 2 of the periodic system and (b) a compound of an element belonging to subgroups 4–6 of the periodic system, to yield either high molecular weight solid plastic material or liquid valuable lubricating oils.

I have now found that lower olefins can be polymerized under low pressure in the presence of halogen, ester or amide derivatives of vinylsulfonic acid, the aforesaid compounds being incorporated into the resulting polymer.

This is an unexpected result in view of the fact that, for example vinylsulfonyl chloride is a strongly polar compound which would have been expected to strongly impair the activity of the aforesaid catalyst systems. I have found, however, that contrary to expectation vinylsulfonyl chloride does not impair the activity of these catalyst systems. The ethylene polymerization, for example, takes about the same smooth course with or without the addition of a vinylsulfonic acid derivative. It is immaterial in this case whether the vinylsulfonic acid derivative is dissolved in the solvent, or the gaseous ethylene to be polymerized is charged with the derivative in vapor form, or whether a liquid vinylsulfonic acid derivative is added dropwise to the reaction mixture during the polymerization.

As derivatives of vinylsulfonic acid which can be copolymerized with olefins there may be mentioned in addition to vinylsulfonic acid chloride the bromide, iodide and fluoride, furthermore the esters of vinylsulfonic acids with straight chain or branched chain alcohols containing 1–18 carbon atoms, such as the methyl, ethyl, n- or isobutyl ester or higher alkyl esters, and also the benzyl and other aralkyl esters; there may also be used the vinylsulfonic acid amide and its alkylation products in which the alkyl groups may contain from 1–18 carbon atoms.

As catalysts there may be used the catalyst systems referred to above which have been described, for example, in British Patents 799,392, 799,823 and 801,031 and by Raff-Allison in "Polyethylene" (1956), pages 72–81. In carrying out the process of this invention it has proved especially advantageous to use a catalyst system comprising (a) the methyl, ethyl, propyl or butyl-aluminum sesquichloride and (b) titanium tetrachloride.

The polymerization proceeds especially smoothly if the two catalyst components are dissolved in a chlorinated hydrocarbon and the resulting solution is allowed to stand for a prolonged period of time, for example 4–12 weeks, so as to "ripen." The "ripening" may also take place in the presence of vinylsulfonyl chloride.

The molecular weight of the polymerization products obtained is influenced to some extent by the diluent used which may be a solvent or dispersant. If a hydrocarbon is used, part of the catalyst system remains undissolved, so that the hydrocarbon should be referred to as being a dispersant. Hydrocarbons which are suitable dispersants are, for example, hexane, heptane, octane, hexadecane, mixtures of paraffin oil or petroleum fractions, especially those which have a boiling range of between about 80° C and 220° C. If the polymerization is carried out in these dispersing agents, solid highly polymeric products are obtained which may have a molecular weight so high that the usual methods employed to determine the molecular weight of macromolecular substances fail to work. If the ethylene polymerization is conducted in the presence of vinylsulfonyl chloride using a paraffinic hydrocarbon as above specified as the dispersant, the ethylene polymerization products have an especially high molecular weight. In contrast herewith, the catalyst components are completely soluble in halogenated hydrocarbons, such as methylene chloride, chloroform, carbon tetrachloride, methyl chloride, methyl bromide, methylene bromide, bromoform, carbon tetrabromide, difluorodichloromethane, difluorodibromomethane, trifluorochloromethane, trifluorobromomethane, dichlorodibromomethane, trichlorotribromomethane, 1,1-dichloroethane, 1,2-dichloroethane, 1,1-dibromoethane, 1,2-dibromoethane, 1,1,1,2 - tetrachloroethane, 1,1,2,2 - tetrachloroethane, or the corresponding tetrabromo-compounds, halogenopropane, halogenobutane or higher halogenated aliphatic hydrocarbons or a mixture of these compounds. The catalyst components dissolved in these halogenated hydrocarbons to give a clear solution and this solubility is warranted for a period of up to about 24 hours. If this catalyst solution is allowed to stand for some weeks, solid crystalline portions separate gradually. The polymerization conducted with the use of these halogenated solvents wherein the catalyst system is completely dissolved, leads to low molecular weight polymers which are liquid and viscous and can be used as lubricating oil or an additive to a lubricating oil.

For copolymerization with vinylsulfonic acid derivatives there can advantageously be used α-olefins carrying 2–18 carbon atoms and more especially ethylene, propylene, butylene, amylene or hexylene, and also branched olefins, such as isobutylene, 2-methylpentene-1 or 2-ethylbutene-1. Diolefins, such as butadiene, isoprene or cyclopentadiene, and aromatic substituted olefins such as styrene or methylstyrene, may also be used as the olefin component in the polymerization process of this invention. The aforesaid olefins may be used alone or in combination.

The relative proportion in which the monomers (olefin and derivative of vinylsulfonic acid) are used for polymerization may vary within very wide limits. Depending on the reaction conditions selected, the end polymer contains the vinylsulfonic acid component in a proportion that the sulfur content of said polymer amounts up to 0.3%. The amount of vinylsulfonic acid derivative incorporated into the polymer depends on the ratio of the individual catalyst components to one another and the ratio of these components to the amount of vinylsulfonic acid derivative used.

The polymerization is advantageously carried out as follows: The reaction vessel is charged with the pure solvent or dispersant and while introducing gaseous olefin or metering in liquid olefin, the catalyst components and vinylsulfonic acid derivative, advantageously dissolved in the same solvent which has been first introduced into the reaction vessel, are simultaneously added continuously or in small portions. It is also possible to first introduce one or more or all components into the reaction vessel and then to add the olefin, or to introduce one catalyst component plus vinylsulfonic acid derivative, of the two catalyst components alone or even the two catalyst components plus vinylsulfonic acid derivative in the form of a joint solution. Another alternative is to charge the gaseous olefin with the derivative of vinylsulfonic acid in vapor form.

The polymerization can be carried out at a temperature in the range of between −30° and +150° C., advantageously between 0° C. and 50° C. When the polymerization is performed at a relatively low temperature, the products obtained are more viscous than those obtained when the polymerization is conducted at a relatively high temperature. The polymerization can be conducted at atmospheric pressure or under superatmospheric pressure (up to about 100 atmospheres.) Sometimes, it may be advantageous to polymerize under reduced pressure.

In some cases it is advisable to admix the solvent or dispersant or the olefins introduced into the reaction vessel with a small amount of an ether, for example diethyl ether, diisopropyl ether, or anisole, whereby the polymerization is especially favored.

Depending on the reaction conditions used, the polymers obtained by the process of this invention are solid products of high molecular weight which can be used for making plastic material, or liquid very viscous substances having good lubricating properties which can be used as lubricating oils. As compared with pure polyolefins the products obtained by this invention offer the advantage that their sulfo groups—as far as polymers of high molecular weight are concerned—can participate in cross-linking reactions. Due to the groups imparted by the vinylsulfonic acid derivative, the oil products of low molecular weight possess certain surface active properties which are very advantageous for the use of these products as lubricating oil. In some cases, i.e. when a vinylsulfonamide is used, the product possesses also certain metal corrosion inhibiting properties and thus constitutes a corrosion inhibiting lubricant. In other cases these corrosion inhibiting properties can be imparted to the product by a subsequent chemical treatment, i.e. by an amination of the sulfonyl chloride groups.

The following examples serve to illustrate the invention but they are not intended to limit it thereto, the parts being by weight unless otherwise stated.

EXAMPLE 1

The following three solutions (a) 2.86 parts of ethyl aluminum sesquichloride dissolved in 21 parts of chloroform,
(b) 1.10 parts of titanium tetrachloride dissolved in 17.5 parts of chloroform,
(c) 1.05 parts of vinylsulfonyl chloride dissolved in 12.5 parts of chloroform, were added dropwise to 150 parts of chloroform while stirring and passing through absolutely dry and chemically pure ethylene.

The vinylsulfonyl chloride solution in chloroform was only added when the polymerization had been started by introducing some drops of solutions (a) and (b) into the polymerization liquid. The exothermal polymerization was carried out at a temperature of 26–29° C. which was maintained by cooling from the outside. When the reaction was complete, a clear, transparent red solution was obtained, which was washed with water and an aqueous sodium carbonate solution and then dried over $Na_2SO_4$. The solvent was removed by distillation, finally under a reduced pressure of 8 mm. of mercury. The resulting lubricating oil had the following properties:

Viscosity in centistokes:
    At 37.8° C _____ 461.96
    At 50° C _____ 241.35
    At 99° C _____ 37.86
Viscosity index _____ 118
Slope factor m of viscosity[1] _____ 2.89
Altitude of viscosity pole[1] _____ 1.51
Content of sulfur _____ percent __ 0.0754
Content of chlorine _____ do ____ 0.650
Saponification number _____ 6.3

[1] As defined in L. Ubbelohde, "Zur Viskosimetrie," 3rd edition, Leipzig, 1940, pp. 14–18.

The lubricating oil so obtained was extracted by boiling it for several hours with acetone. The acetone was poured off and the product was again boiled with fresh acetone. The following results were obtained:

|  | Grams | Percent S | Percent Cl |
| --- | --- | --- | --- |
| Crude product | 16.5 | 0.075 | 0.65 |
| Extracted product | 1.35 | 0.18 | 0.91 |
| Refined product | 13.9 | 0.049 | 0.55 |

EXAMPLE 2

1.28 parts of vinyl sulfonyl chloride were dissolved in in 100 parts of chloroform and 50 parts of methylene chloride. The solution obtained was stirred while ethylene was passed through with simultaneous dropwise addition of the following two catalyst solutions:

(a) 4.3 parts of methyl-aluminum sesquichloride dissolved in 20 parts of chloroform,
(b) 1.33 parts of titanium tetrachloride dissolved in 20 parts of chloroform.

The temperature was maintained at 26–29° C. by cooling from the outside. The lubricating oil obtained after washing and elimination of the solvent had the following properties:

Viscosity in centistokes:
    At 37.8° C _____ 4640.8
    At 50° C _____ 2291.6
    At 99° C _____ 281.9
Viscosity index _____ 104
Slope factor m of viscosity[1] _____ 2.25
Altitude of viscosity pole[1] _____ 1.33
Pour point _____ −12° C.
Content of sulfur _____ percent __ 0.205
Content of chlorine _____ do ____ 2.2

[1] As defined in L. Ubbelohde, "Zur Viskosimetrie," 3rd edition, Leipzig, 1940, pp. 14–18.

EXAMPLE 3

0.1 part of vinylsulfonyl chloride was dissolved in 150 parts of n-heptane, ethylene was introduced into the solution while stirring and the following three solutions were added dropwise:

(a) 50 parts of n-heptane plus 1.2 parts of vinylsulfonyl chloride,
(b) 50 parts of n-heptane plus 4.4 parts of methyl-aluminum sesquichloride,
(c) 50 parts of n-heptane plus 1.36 parts of titanium tetrachloride.

1/10 each of solutions (a) and (b) above was added at once to start the polymerization. The temperature was maintained at 22° C. 54 grams of a solid white powder were obtained which was extracted with warm acetone. 6.6% of a viscous extract were obtained which had a content of sulfur of 1.82%. The portion of the white powder which did not dissolve during extraction contained 0.154% of sulfur and 0.454% of chlorine. This solid polymer started melting at 129° C. and melted completely only at 178° C.

EXAMPLE 4

A solution of 10.2 parts of methyl-aluminum sesquichloride and 9.5 parts of titanium tetrachloride in 127 parts of chloroform was introduced at 20° C. into a mixture of 4.0 parts of vinylsulfochloride and 224 parts of chloroform while stirring and passing through propylene.

Polymerization set in after addition of about 60% of the catalyst solution. The propylene consumption was so regulated by the rate at which the catalyst mixture was dropped in that the temperature was maintained constant. When about 100 liters of gas had been absorbed, the reaction was arrested by pouring in water, the organic phase was washed with sodium carbonate solution, dried over $Na_2SO_4$, and the solvent was evaporated, finally under a reduced pressure of 8 mm. of mercury. 157 parts of a lubricating oil having the following properties were obtained:

Viscosity in centistokes:
| | |
|---|---|
| At 38° C | 495.3 |
| At 99° C | 22.36 |
| Viscosity index | 66.4 |
| Four point | −21° C. |
| Flash point | 201° C. |
| Medium molecular weight | 570 |
| Content of chlorine___percent | 0.34 |
| Content of sulfur___do | 0.16 |
| Ash content___do | 0.01 |

EXAMPLE 5

1-butene was introduced at 20° C. into a solution of 2.0 parts of vinylsulfochloride, 5.1 parts of methyl-aluminum sesquichloride and 4.75 parts of titanium tetrachloride in 288 parts of chloroform. The polymerization started at once. When about 100 liters of gas had been absorbed, the polymerization was interrupted by pouring in water, the chloroform layer was washed with a sodium carbonate solution, dried over $Na_2SO_4$ and the solvent was removed by distillation, finally under a pressure of 8 mm. of mercury. 140 parts of a lubricating oil having the following properties were obtained:

| | |
|---|---|
| Viscosity at 38° C___centistokes | 286.7 |
| Viscosity at 99° C___do | 18.55 |
| Viscosity index | 75 |
| Pour point | −29° C. |
| Flash point | 192° C. |
| Medium molecular weight | 640 |
| Content of chlorine___percent | 0.20 |
| Content of sulfur___do | 0.08 |
| Ash content___do | 0.01 |

EXAMPLES 6–10

The amount of vinylsulfonylchloride incorporated into the ethylene polymer depends on the ratio of titanium to aluminum in the catalyst as indicated in the following table:

Table

| Example | Mols $TiCl_4$ | Aluminum-sesqui-chloride | $CH_2=CH.SO_2Cl$ | Amount of polymer in parts by weight | Sulfur content of polymer in percent by weight | Amount of $CH_2=CH.SO_2Cl$ incorporated by polymerization |
|---|---|---|---|---|---|---|
| 6 | 1 | 3 | 1.3 | 93 | 0.1 | [1] 23.6%; |
| 7 | 1 | 1 | 0.6 | 76 | 0.09 | 20%. |
| 8 | 4 | 1 | 1.0 | 17 | 0.2 | 11.2%. |

When the catalyst mixture $TiCl_4+Al(CH_3)_2Cl$ dissolved in chloroform is allowed to "ripen" for 4 weeks and then used, the following result is obtained:

| | | | | | | |
|---|---|---|---|---|---|---|
| 9 | 1 | 1 | [2] 0 | 131 | 0.1 | 48.5%. |

If the "ripening" takes place in the presence of vinylsulfonyl chloride, the following result is obtained:

| | | | | | | |
|---|---|---|---|---|---|---|
| 10 | 1 | 1 | [3] 0.68 | 176 | 0.17 | 20.3%. |

[1] (Explanation: 23.6% means that after extraction of the polymer obtained with acetone 23.6% of vinyl sulfonyl chloride were found to be acetone-inextractible, in other words incorporated into the polymer.)
[2] This means that no vinyl sulfonyl chloride was added to the catalyst suspension. However the ethylene introduced into the mixture contained 0.68 parts by weight of vinyl sulfonyl chloride vapor.
[3] The ethylene introduced into the catalyst mixture contained 3.4 parts by weight of vinyl sulfonyl chloride vapor.

We claim:
1. A process for the manufacture of a copolymer of (1) at least one α-olefin, said olefin being a monoethylenically unsaturated hydrocarbon having 2–4 carbon atoms and (2) a compound selected from the group consisting of vinylsulfonyl chloride, vinylsulfonyl bromide, vinylsulfonyl iodide, vinylsulfonyl fluoride, a vinylsulfonic acid ester of an alcohol having 1 to 18 carbon atoms, vinylsulfonamide, alkylated vinylsulfon amides, the alkyl chains of which having 1 to 18 carbon atoms and mixtures thereof, which comprises contacting in an inert diluent the components 1 and 2 with a catalyst system consisting essentially of (a) an alkylaluminum sesquichloride wherein the alkyl group contains 1–4 carbon atoms and (b) titanium tetrachloride.

2. The process of claim 1 wherein the inert diluent is a hydrocarbon.

3. The process of claim 1 wherein the inert diluent is a halogenated hydrocarbon.

4. A process for the manufacture of a copolymer of at least one alpha-monoolefin having 2–4 carbon atoms and an amount of a derivative of vinyl sulfonic acid corresponding to a sulfur content of the copolymer of up to 0.3% said derivative being selected from the group consisting of vinylsulfonyl chloride, vinylsulfonyl bromide, vinylsulfonyl iodide, vinylsulfonyl fluoride, a vinylsulfonic acid ester of an alcohol having 1 to 18 carbon atoms, vinylsulfon amide, alkylated vinylsulfon amides, the alkyl chain of which having 1 to 18 carbon atoms and mixtures thereof, which comprises contacting said monomers in an inert diluent with a catalyst system consisting essentially of $TiCl_4$ and methyl aluminum sesquichloride.

5. A copolymer of an α-olefin, said olefin being a monoethylenically unsaturated hydrocarbon containing 2–4 carbon atoms, and a vinylsulfonyl halide.

6. The copolymer of claim 5 wherein the vinylsulfonyl halide is vinylsulfonyl chloride.

References Cited in the file of this patent

UNITED STATES PATENTS

| | | |
|---|---|---|
| 2,527,300 | Dudley | Oct. 24, 1950 |
| 2,653,973 | Hedrick | Sept. 29, 1953 |
| 2,827,447 | Nowlin | Mar. 18, 1958 |
| 2,884,452 | Scherer | Apr. 28, 1959 |